May 31, 1938.    H. KÜPPENBENDER    2,119,235

PHOTOGRAPHIC CAMERA

Filed Feb. 17, 1936

Inventor:
Heinz Küppenbender
by B. Singer
Atty.

Patented May 31, 1938

2,119,235

UNITED STATES PATENT OFFICE 2,119,235

PHOTOGRAPHIC CAMERA

Heinz Küppenbender, Dresden, Germany, assignor to Zeiss Ikon Aktiengesellschaft, Dresden, Germany Application February 17, 1936, Serial No. 64,322
In Germany March 4, 1935

3 Claims. (Cl. 88—23)

This invention relates to improvements in photographic cameras.

It is an object of the invention to provide a camera adapted for producing pictures on roll film material which may be moved to and from exposure position, the housing of the camera, however, remaining unobstructed by additional equipment which heretofore had frequently been disposed in the housing.

It is, furthermore, an object of the invention to provide a camera in which an exposure meter housing may fixedly or detachably be secured to an outer face of the camera housing, in order to reduce the volume of the camera housing.

Another object of the invention is to provide a photographic camera in which the housing is constructed in the form of a relatively narrow case with narrow end walls, top and bottom walls, and broad front and rear walls, the instrumentalities for the movement of the film being accessible from the outside at a narrow wall and the space between the instrumentalities on the narrow wall being occupied by an exposure meter.

With these and other objects in view, an embodiment of the invention is described in the following specification and illustrated in the accompanying drawing, wherein.

Figure 1:
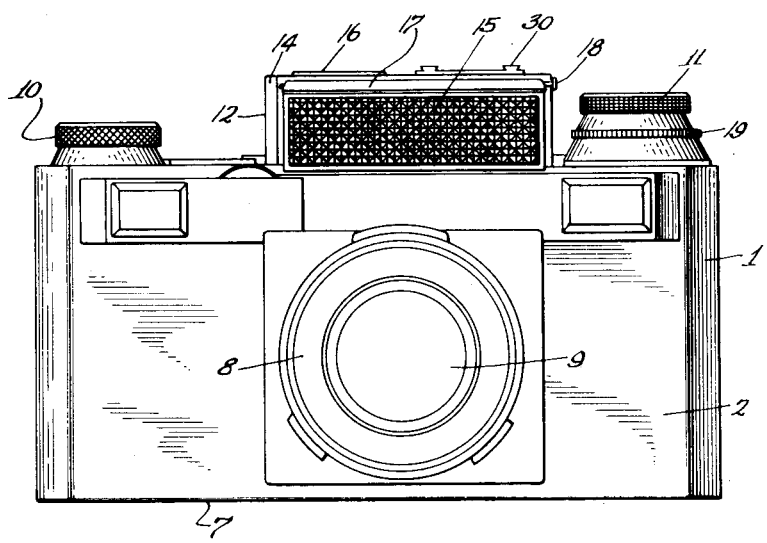
Fig. 1 is a front elevation of a camera combined with an exposure meter, according to the present invention.
Figure 2:
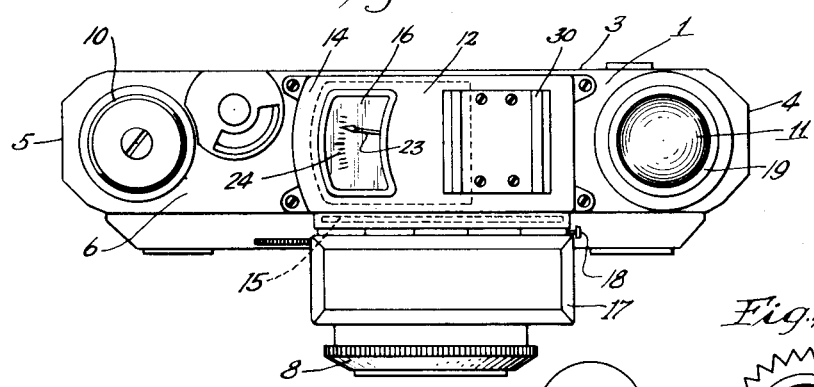
Fig. 2 is a top plan view of the camera and exposure meter.
Figure 4:
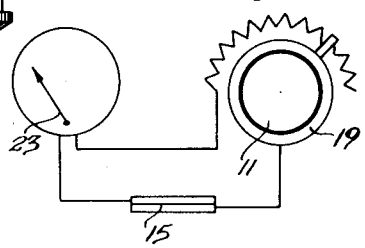
Fig. 4 is a wiring diagram of the exposure meter.
Figure 3:
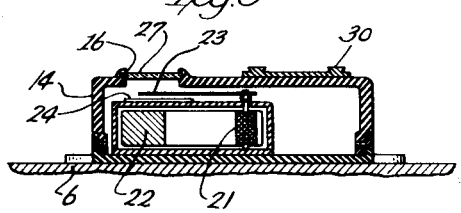
Fig. 3 is a sectional view through the exposure meter and adjacent wall portion of the camera.

The camera housing 1 is constructed in the shape of a relatively narrow case having the front wall 2 and the rear wall 3, two end walls 4 and 5, and the top and bottom walls 6 and 7, respectively. A mounting 8 for a lens 9 may be fixedly or exchangeably disposed on the front wall 2 of the camera. Instrumentalities for controlling the shutter and film movement project to the outside of the camera to facilitate the operation. These instrumentalities which are located near the opposite ends of the top wall 6 comprise a rotary button 10 for tensioning the shutter and for effecting the feeding of the film, and another rotary button 11 serves for the reverse winding of the film.

A housing 14 for an exposure meter 12 is secured to the narrow top wall of the camera housing 1, and may be detachable to permit the camera to be used without this additional instrument. The housing 14 has its front wall facing in the same direction as the front wall of the camera housing 1, and this front wall of the housing 14 contains or is formed by the photoelectric cell 15.

The current generated upon energization of the photoelectric cell is controlled in conventional manner by variation of a resistance and is directed through a rotary coil 21 suitably supported between the shoes of a magnet 22, whereby upon part rotation of said coil 21, a pointer 23 connected therewith is caused to play over a scale 24 forming a part of the instrument. The variation of the resistance interposed in the circuit of the photoelectric cell is effected by rotation of a disc 19 which is shown to be coaxially arranged with the knob 11. The top wall of the meter housing 14 has an opening 16 preferably covered by a transparent window 27 and through which the pointer 23 and scale 24 may be observed from the top. As will be seen, the axis of the rotary coil is located at right angle to the normal operative direction of the camera, whereby the delicate bearings for the coil are guarded against excessive strain.

In order to protect the photoelectric cell 15 against energization by light when the camera is not in use, a swinging cover 17 is secured at the front of the housing 14 of the exposure meter, the hinge for supporting the cover 17 being of such construction that upon manipulation of a locking button 18 for said hinge, the cover 17 is snapped upwardly to free thereby the photoelectric cell for energization by the light reflected from the object to be photographed. Spring hinges of this character are well known, as are also the means for locking the cover 17 in obstructing position when it is pressed downwardly against the action of the spring hinge on which it is supported.

The top wall of the housing 14 for the exposure meter also is equipped with a guide way 30 fixedly secured thereto and providing bars for slidably and detachably supporting some other instrumentality which may be of value in taking pictures, as for instance, a view finder, a flashlight or the like.

I claim:

1. The combination with a photographic camera provided with a camera casing having a relatively narrow top wall, and film winding instrumentalities extending outside of said top wall; of a photoelectric exposure meter comprising a photoelectric cell, an electrical measuring instrument and a resistance, said photoelectric cell and electrical measuring instrument being mounted in a housing which is attached to the outside of the top wall of said camera housing between said film winding instrumentalities, the housing of said exposure meter having an opening in a wall facing the same direction as the front wall of said camera housing, through which opening light passes to said photoelectric cell, and manually operable means for varying said resistance, said last named means being coaxially positioned with respect to one of said film winding instrumentalities and being independently rotatable with respect to the latter.

2. The combination with a photographic camera provided with a camera housing having a relatively narrow top wall, a shutter tensioning button at one end of said top wall, and a film rewinding button at the opposite end of said top wall; of a photoelectric exposure meter comprising a photoelectric cell, an electrical measuring instrument and a resistance, said photoelectric cell and electrical measuring instrument being mounted in a housing which is attached to the outside of the top wall of said camera housing between the said buttons, the housing of said exposure meter having an opening in a wall facing the same direction as the front wall of said camera housing, through which opening light passes to said photoelectric cell, and manually operable means for varying said resistance, said last named means being coaxially positioned with respect to said film rewinding button and being independently rotatable with respect to the latter.

3. The combination with a photographic camera provided with a camera housing having a relatively narrow top wall, a shutter tensioning button at one end of said top wall, and a film rewinding button at the opposite end of said top wall; of a photoelectric exposure meter comprising a photoelectric cell, an electrical measuring instrument and a resistance, said photoelectric cell and electrical measuring instrument being mounted in a housing which is attached to the outside of the top wall of said camera housing between the said buttons, the housing of said exposure meter having an opening in a wall facing the same directions as the front wall of said camera housing, through which opening light passes to said photoelectric cell, the housing of said exposure meter having also a window in its top wall through which said measuring instrument is observed, and manually operable means for varying said resistance, said last named means being coaxially positioned with respect to said film rewinding button and being independently rotatable with respect to the latter.

HEINZ KÜPPENBENDER.